United States Patent
Koster et al.

(10) Patent No.: US 9,014,364 B1
(45) Date of Patent: Apr. 21, 2015

(54) CONTACT CENTER SPEECH ANALYTICS SYSTEM HAVING MULTIPLE SPEECH ANALYTICS ENGINES

(71) Applicant: Noble Systems Corporation, Atlanta, GA (US)

(72) Inventors: Karl H. Koster, Sandy Springs, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 14/230,328

(22) Filed: Mar. 31, 2014

(51) Int. Cl.
| | |
|---|---|
| H04M 3/00 | (2006.01) |
| H04M 5/00 | (2006.01) |
| H04M 1/64 | (2006.01) |
| G10L 15/18 | (2013.01) |
| H04M 3/42 | (2006.01) |
| H04M 3/493 | (2006.01) |

(52) U.S. Cl.
CPC ........ G10L 15/1815 (2013.01); H04M 3/42221 (2013.01); H04M 3/4936 (2013.01); H04M 2201/40 (2013.01)

(58) Field of Classification Search
CPC ........ G06Q 10/06; H04M 3/323; H04M 3/36; H04M 3/4285; H04M 3/493; H04M 3/51; H04M 3/5166; H04M 3/5175; H04M 3/5183; H04M 3/523; H04M 3/5232; H04M 3/5233; H04M 3/5237; H04M 3/5238; H04M 2203/2011; H04M 2203/2061; H04M 2242/12
USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | |
|---|---|---|---|
| 5,267,305 | A | 11/1993 | Prohs et al. |
| 5,270,920 | A | 12/1993 | Pearse et al. |
| 6,157,808 | A | 12/2000 | Hollingsworth et al. |
| 6,356,634 | B1 | 3/2002 | Noble, Jr. |
| 6,862,343 | B1 | 3/2005 | Rilantono et al. |
| 7,133,828 | B2 | 11/2006 | Scarano et al. |
| 7,542,902 | B2 | 6/2009 | Scahill et al. |
| 7,548,539 | B2 | 6/2009 | Kouretas et al. |
| 7,574,000 | B2 | 8/2009 | Blair |

(Continued)

OTHER PUBLICATIONS

Three Steps for Attacking Adherence Problems, Reynolds, Penny, Contact Center Association, Jan. 24, 2012.

(Continued)

*Primary Examiner* — Khai N Nguyen

(57) ABSTRACT

Various embodiments of the invention provide methods, systems, and computer-program products for providing a plurality of speech analytics engines in a speech analytics module for detecting semantic and non-semantic speech characteristics in the audio of a call involving an agent in a contact center and a remote party. The speech analytics module generates event notification messages reporting the detected semantic and non-semantic speech characteristics and these messages are sent to an event handler module that forwards the messages to one or more application specific modules. In turn, the application specific modules provide functionality based on the semantic and non-semantic speech characteristics detected during the call such as, for example, causing information to be presented on the screen of a computer used by the agent during the call.

14 Claims, 10 Drawing Sheets

(56) References Cited

U.S. PATENT DOCUMENTS

| | | | |
|---|---|---|---|
| 7,672,845 B2 | 3/2010 | Beranek et al. | |
| 7,752,043 B2 | 7/2010 | Watson | |
| 7,930,179 B1 | 4/2011 | Gorin et al. | |
| 7,974,411 B2 | 7/2011 | Krishnapuram et al. | |
| 8,078,470 B2 | 12/2011 | Levanon | |
| 8,094,790 B2 | 1/2012 | Conway et al. | |
| 8,094,803 B2 | 1/2012 | Danson et al. | |
| 8,175,007 B2 | 5/2012 | Jain et al. | |
| 8,180,643 B1 | 5/2012 | Pettay et al. | |
| 8,209,182 B2 | 6/2012 | Narayanan | |
| 8,219,401 B1 | 7/2012 | Pettay et al. | |
| 8,249,875 B2 | 8/2012 | Levanon et al. | |
| 8,275,115 B1 | 9/2012 | Everingham et al. | |
| 8,396,205 B1 | 3/2013 | Lowry et al. | |
| 8,401,155 B1 | 3/2013 | Barnes et al. | |
| 8,422,641 B2 | 4/2013 | Martin, II | |
| 8,463,606 B2* | 6/2013 | Scott et al. | 704/232 |
| 8,531,501 B2 | 9/2013 | Portman et al. | |
| 8,761,376 B2* | 6/2014 | Pande et al. | 379/265.06 |
| 8,781,092 B2 | 7/2014 | Noble, Jr. | |
| 2003/0002651 A1 | 1/2003 | Shires | |
| 2004/0008828 A1 | 1/2004 | Coles et al. | |
| 2006/0050658 A1 | 3/2006 | Shaffer et al. | |
| 2006/0111953 A1 | 5/2006 | Setya | |
| 2006/0233346 A1 | 10/2006 | McIlwaine et al. | |
| 2006/0256954 A1 | 11/2006 | Patel et al. | |
| 2006/0262919 A1* | 11/2006 | Danson et al. | 379/265.02 |
| 2006/0265090 A1* | 11/2006 | Conway et al. | 700/94 |
| 2007/0088563 A1 | 4/2007 | Nardotti, Jr. et al. | |
| 2007/0111180 A1 | 5/2007 | Sperle et al. | |
| 2007/0280460 A1 | 12/2007 | Harris et al. | |
| 2008/0240376 A1 | 10/2008 | Conway et al. | |
| 2008/0270123 A1* | 10/2008 | Levanon et al. | 704/200.1 |
| 2010/0104086 A1 | 4/2010 | Park | |
| 2010/0138411 A1 | 6/2010 | Judy et al. | |
| 2010/0158237 A1 | 6/2010 | McCormack et al. | |
| 2010/0161990 A1 | 6/2010 | Statham et al. | |
| 2011/0010173 A1* | 1/2011 | Scott et al. | 704/235 |
| 2011/0026688 A1 | 2/2011 | Simpson | |
| 2011/0033036 A1 | 2/2011 | Edwards et al. | |
| 2011/0125499 A1 | 5/2011 | Griggs et al. | |
| 2011/0218798 A1 | 9/2011 | Gavalda | |
| 2011/0228919 A1 | 9/2011 | Tew et al. | |
| 2011/0307258 A1 | 12/2011 | Liberman et al. | |
| 2012/0140911 A1 | 6/2012 | Johansen et al. | |
| 2013/0003943 A1* | 1/2013 | Munns et al. | 379/88.01 |
| 2013/0208881 A1* | 8/2013 | Pande et al. | 379/265.07 |
| 2014/0241519 A1 | 8/2014 | Watson et al. | |

OTHER PUBLICATIONS

Asterisk DTMF, Voip=lnfo.o—A Reference Guide to all Things VoIP, four pages, retrieved on Mar. 18, 2013 from www.voip-info.org/wiki/view/Asterosk+DTMF.

Notice of Allowance received for U.S. Appl. No. 13/861,102, mailed May 2, 2014.

Office Action Received for U.S. Appl. No. 14/186,404 dated Dec. 12, 2014.

Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.

Donovan, S; Request for Comments 2976 ("RFC 2976"), The SIP INFO Method; The Internet Society, Oct. 2000, 9 pages, U.S.

Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

Homberg, C; Burger, E; Kaplan, H.; Request for Comments 6086 ("RFC 6086"), Session Initiation Protocol (SIP) INFO Method and Package Framework, Internet Engineering Task Force, Jan. 2011, 36 pages, U.S.

Kuthan, Jiri; Sisalem, Dorgham; SIP: More Than You Ever Wanted to Know About; Powerpoint Presentation, Mar. 2007, 242 pages, Tekelec, U.S.

Office Action Received for U.S. Appl. No. 13/949,467 dated Feb. 6, 2015.

* cited by examiner

CONTACT CENTER SPEECH ANALYTICS SYSTEM HAVING MULTIPLE SPEECH ANALYTICS ENGINES

BACKGROUND

Contact centers frequently employ speech analytics systems to detect the meaning of words spoken during a call by a remote party or an agent of the contact center. Many such systems employ various forms of algorithmic-based processing of digital speech signals to recognize the meaning of words. These speech analytics systems may be referred to as semantic-based speech analytics systems since the speech is analyzed to determine its meaning.

However, research into speech analytics has also suggested that speech can be analyzed to provide non-semantic-based indicators such as, for instance, a speaker's gender, age, personality, emotion, and/or identification. Accordingly, as algorithms that identify such indicators are refined to provide more accurate results, the use of these types of indicators are expected to be more frequently incorporated into contact centers. For instance, customer service applications performed within a contact center may benefit from obtaining non-semantic speech indicators for a call such as knowing the age or gender of a caller. In many instances, a contact center may find it advantageous to deploy a single speech analytics system that is capable of providing both semantic and non-semantic speech indications. Accordingly, it is with respect to these considerations and others that the disclosure herein is presented.

BRIEF SUMMARY

In general, embodiments of the present invention provide computer-program products, methods, systems, apparatus, and computing entities for a speech analytics system ("SAS") that can provide indicators for both semantic and non-semantic speech characteristics. For instance, in particular embodiments, a contact center may make use of a SAS to analyze the speech of a call between an agent and a remote party. In turn, the SAS may provide indicators for both semantic and non-semantic speech characteristics detected during the call and certain actions related to the handling of the call may be performed based on the detection of these speech characteristics.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
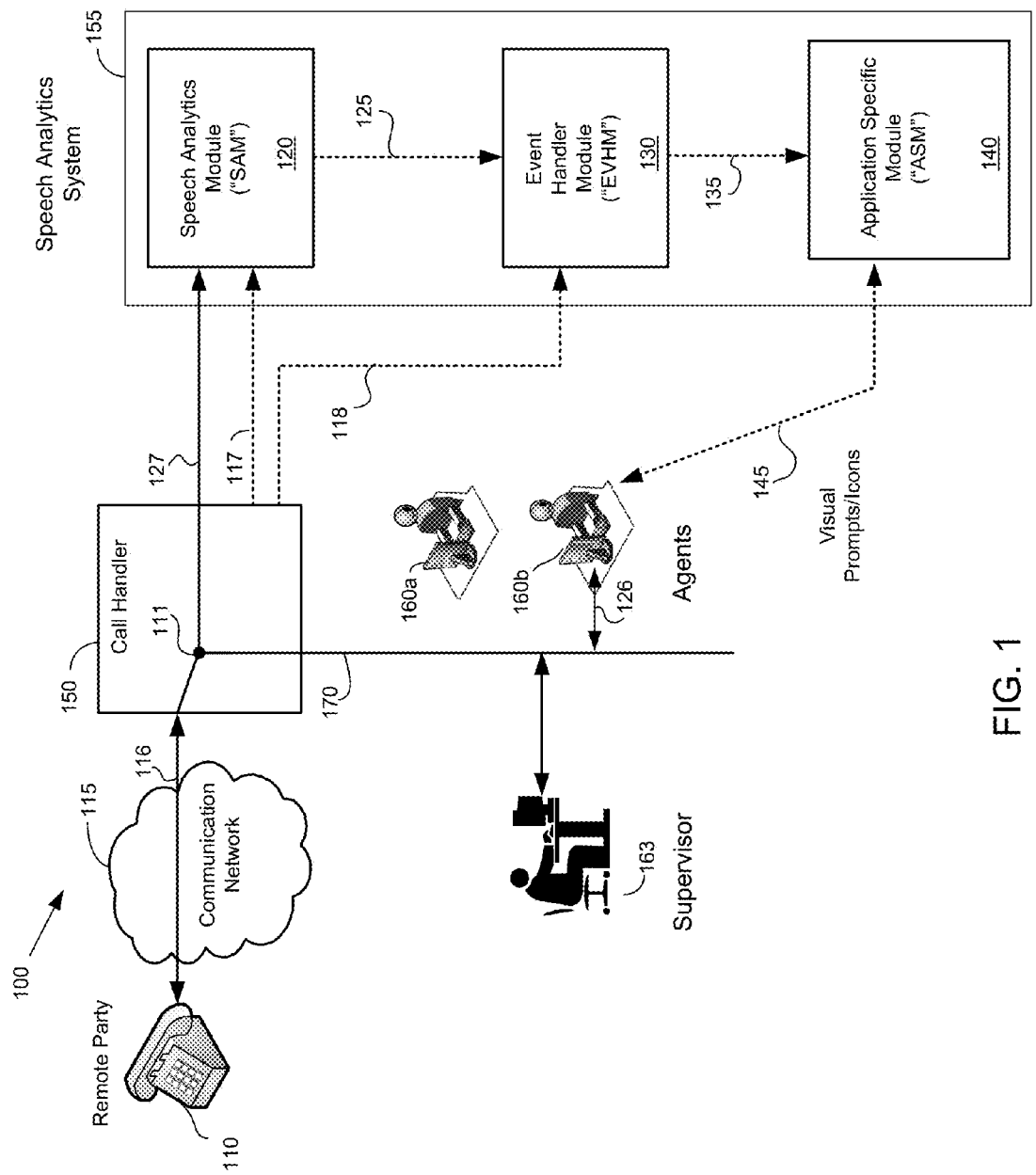
FIG. 1 illustrates one embodiment of a contact center architecture using a speech analytics system for processing speech audio according to various technologies and concepts disclosed herein.

Various embodiments for practicing the technologies and concepts disclosed herein are described more fully hereinafter with reference to the accompanying drawings, in which some, but not all embodiments of the various technologies and concepts disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Contact centers may deploy a speech analytics system ("SAS") for processing speech from a remote party and/or an agent involved in a telephone call. For instance, architectures of various SASs are disclosed in U.S. patent application Ser. No. 14/080,912, filed on Nov. 15, 2013, and entitled "Architecture for Processing Real Time Event Notifications from a Speech Analytics System" and U.S. patent application Ser. No. 14/073,083, filed on Nov. 6, 2013, and entitled "Configuring Contact Center Components for Real Time Speech Analytics," in which the contents of both are incorporated by reference for all that they teach.

The ability to detect semantics in speech from a remote party and/or an agent refers to understanding the meaning of the words in the speech. This can provide great utility in a contact center context. For instance, understanding the meaning of the words in speech can allow a contact center to monitor, detect, and react to compliance-related situations, among other things, such as those described in U.S. patent application Ser. No. 13/949,467, filed on Jul. 24, 2013, and entitled "Management System for Using Speech Analytics to Enhance Contact Center Agent Conformance" and U.S. patent application Ser. No. 13/968,692, filed on Aug. 16, 2013, and entitled "Functions and Associated Communication Capabilities for a Speech Analytics Component to Support Agent Compliance in a Call Center," in which the contents of both are incorporated by reference for all that they teach.

In recent years, research into speech analytics has also focused on detecting non-semantic characteristics of human speech such as, for instance, detecting a speaker's age or gender. That is to say, humans frequently are able to ascertain with some accuracy by listening to a speaker talking the gender of the speaker and/or an age group of the speaker and current speech analytics systems are attempting to ascertain these same characteristics with improved accuracy.

Accordingly, a contact center may analyze speech between a party and an agent so as to benefit from detecting both semantic and non-semantic characteristics. This is because in some instances, a solely semantics analysis may be inaccurate. For example, it can be readily appreciated that a first caller speaking with an agent may answer affirmatively to a question by responding "yes," and depending on the tone of the first caller's voice, the semantic indication of "yes" would be accurate. On the other hand, a second caller speaking with the agent may answer the same question by responding "yeah, oh sure." However, in this instance, the second caller may be answering in a sarcastic tone and may not be answering affirmatively to the question. In this instance, the semantic SAS may equate "yes" and "yeah, oh sure" as both answering affirmatively to the question and thus, the semantic SAS may detect the opposite of the true meaning of the second caller's answer. Similarly, certain words can be spoken with high emotion, such as extreme anger, and convey a different context than when spoken in a calm manner. Thus, in many instances, the more information a contact center SAS has characterizing speech, the better the SAS may be able to properly interpret a current situation.

With this in mind, other non-semantic characteristics may be of interest. For instance, humans speaking when they are happy typically speak in a different manner than when they are angry or sad. Accordingly, a variety of emotions may be detected with varying degrees of accuracy by analyzing speech. Furthermore, the identity of a speaker may be detected by analyzing speech. For example, a library of speech samples may be retained for various known individuals and a current speech sample may be compared to the samples in the library to identify the speaker or alternatively, to verify the speaker's alleged identity. While in other applications, personality characteristics of a speaker may be identified by analyzing speech. For instance, five main personality characteristics (sometime referred to as the "big 5" personality characteristics) may be determined to varying degrees of accuracy based on analyzing speech. In some instances, such determinations may involve analyzing the semantics of the speech. For example, the word choice and patterns used in speech may be indicative of certain personality traits. Thus, providing some forms of non-semantic characteristics (e.g., a speaker's personality characteristics) may involve performing a semantic analysis of the speech along with other aspects.

As used herein, a semantic speech characteristic refers to information reporting the meaning of uttered words or speech by a speaker, whereas a non-semantic speech characteristic refers to a characteristic pertinent to the speaker or delivery of speech by the speaker that does not directly indicate the meaning of uttered words or speech by the speaker. As noted above, some instances may require semantic processing to ascertain the appropriate non-semantic speech characteristic. Further, it is possible that other forms of non-semantic speech characteristics may be provided than those identified above. Thus, the application of speech analytics engines directed to other forms of non-semantic speech characteristics may use the concepts and technologies disclosed herein.

Contact Center Architecture

FIG. 1 illustrates one embodiment of a contact center architecture 100 employing a SAS 155 that uses multiple speech analytics engines for detecting semantic and non-semantic characteristics of speech. In this architecture 100, a remote party, such as a called or calling party, is represented by a conventional telephone 110. The conventional telephone 110 communicates using a voice path 116 over a communication network 115 that may involve any of the well-known communication networks and technologies for conveying voice, such as, for example, traditional analog phone networks, digital phone networks, voice over IP ("VoIP") technologies, cable networks, etc. Although not shown, the remote party could also utilize various forms of wireless technologies to convey voice.

The voice path 116 is connected with a call handler 150 that may be any one of various forms of call handling equipment found in a contact center, such as, but not limited to, automatic call distributors, private branch exchanges, dialers, etc. In this embodiment, the remote party is speaking with one of a plurality of agents that are shown as interacting with a computer 160a-160b. The computer 160a-160b may be a workstation capable of also handling voice using well known technologies such as VoIP for example. Thus, the agent may utilize a so-called soft phone that may comprise a headset controlled by software in the computer for providing digitized voice. A LAN 170 or other communication facility may be used to convey voice packets over a link 126 to a particular agent's computer 160b. The LAN 170 may also allow data from various sources to be transmitted and received in the contact center so that when an agent is handling a voice call, corresponding data about the remote party may be displayed on the agent's computer 160b. Further, in FIG. 1, a supervisor 163 is shown who also has access to the LAN 170. Depending on the circumstances, the supervisor 163 may monitor, listen in, or otherwise assist agents with certain calls.

The embodiment of the contact center architecture 100 shown in FIG. 1 includes a SAS 155 for monitoring the speech of calls by using a bridge 111 that allows speech to be provided on a call leg 127 to the SAS 155 in real time. Although the call leg 127 is shown as a single call leg, it may in fact comprise two audio streams, one for the agent and one for the remote party. Thus, the SAS 155 may be able to readily distinguish audio coming from the agent or the remote party based on which audio stream of the call leg 127 the audio is received on.

The SAS 155 shown in FIG. 1 comprises three modules, the speech analytics module ("SAM") 120, the event handler module ("EVHM") 130, and the application specific module ("ASM") 140. For this particular embodiment, each module may comprise individual instructions stored in memory that are executed by one or more processors to accomplish various functions. While in other embodiments, the modules may be combined and executed by one or more common processors. For example, the EVHM 130 and the ASM 140 may be implemented within a single processing system comprising a processor executing logical sets of instructions for each module 130, 140. As can be appreciated, various configurations are possible for executing the modules of the SAS 155 and FIG. 1 illustrates but one such configuration. Accordingly, FIG. 1 is not intended to limit application of the concepts and technologies disclosed herein with respect to how these modules 120, 130, 140 can be used in practicing these concepts and technologies.

At a high level, the SAM 120 is configured to receive and analyze speech. In addition, in particular embodiments, the SAM 120 produces event notification messages to report detection of speech-related characteristics as well as call-related characteristics. For instance, for the embodiment shown in FIG. 1, the SAM 120 conveys such messages over a link 125 to the EVHM 130 and the EVHM 130 in turn, largely functions as a router to further distribute the event notification messages to the appropriate ASM(s) 140.

Accordingly, in various embodiments, the SAS 155 is typically aware of each call as a result of receiving indications of different calls that are established or terminated between agents and remote parties. For instance, in particular embodiments, the call handler 150 provides signaling over a path 117 to the SAM 120 to notify the SAM 120 when a call is established or terminated between an agent and a remote party. In particular instances, this signaling may also be used to initiate establishing or dropping a call leg 127 and/or audio streams between the call hander 150 and the SAS 155. Accordingly, the SAM 120 knows when a call leg 127 is established or dropped and once it knows about the call leg 127, the SAM 120 can report this event to the EVHM 130 using signaling path 125. In particular embodiments, the call handler 155 may instead inform the EVHM 130 of the establishment or termination of a call between an agent and a remote party directly via signaling path 118 and essentially bypass the SAM 120. In either case, the EVHM 130 is made aware of the establishment of a call, as well as the termination of a call, and passes this information to the appropriate ASM(s) 140 using signaling path 135.

In general, an ASM 140 provides functionality for handling a particular application with respect to the contact center. For instance, an ASM 140 may define what actions are performed during a call when a particular speech characteristic is detected on the call. Accordingly, several ASMs 140 may be present in the SAS 155 although FIG. 1 only depicts a single ASM 140. Furthermore, the scope of a particular ASM 140 may vary greatly from the scope of other ASMs 140 depending on the particular applications handled by the ASMs 140. For example, a first ASM 140 may be defined to assist an agent upon detecting a remote party asking a particular product question while a second ASM 140 may be defined to determine whether an agent used a proper greeting when answering a call.

Further, certain calls may be associated for SAS processing and involve certain ASMs 140. For example, agents handling incoming calls may be monitored to ensure they provide an appropriate greeting, and thus calls involving these agents may be reported to a particular ASM 140 handling this function. However, agents handling outgoing calls are not required to provide the same greeting, and thus calls involving these agents may not be reported to the particular ASM 140 monitoring greetings for agents handling incoming calls.

In various embodiments, operation of a particular ASM 140 is dependent on the SAM 120 detecting a semantic and/or non-semantic characteristic of either the agent or party and reporting the detection as an event notification message to the EVHM 130, which in turn reports the event notification message to the particular ASM 140. Furthermore, in various embodiments, a particular ASM 140 may be configured to handle multiple calls at the same time. For instance, in particular embodiments, the ASM 140 may accomplish this task by invoking a call instance for each call. That is to say, the ASM 140 may create a data structure known as a call instance for each new call reported as established between an agent and a remote party and terminate the corresponding call instance for each call reported as terminated, e.g., being ended between an agent and a remote party. For instance, if an ASM 140 is configured to determine whether an agent has used a proper greeting for a call, then the ASM 140 may be managing a plurality of calls via a call instance for each call at the same time to determine whether a plurality of agents fielding the calls have used the proper greeting. Thus, an ASM 140 may be able to distinguish between different calls even though the ASM 140 is handling the same application (e.g., monitoring the agent's greeting) for each call. As can be appreciated, many of the ASMs 140 are more complicated and more involved than the examples provided above. A more sophisticated ASM 140 is described below to illustrate the application of the principles and concepts disclosed herein.

Accordingly, an ASM 140 may receive event notification messages indicating the establishment and/or termination of a call and event notification messages indicating the detection of particular characteristics of speech for the call. Event notification messages indicating either establishment or termination of a call are generally referred to as call-related event notification messages. As indicated earlier, these types of messages may be sent to the EVHM 130 either from the SAM 120 via signaling path 125 or from the call handler 150 via signaling path 118. Depending on the embodiment, the EVHM 130 may be configured to provide a copy of each call-related event notification message to each ASM 140 or to provide each call-related event notification message to only select ASMs 140.

Event notification messages indicating detection of speech-related characteristics are generally referred to as speech-related event notification messages. As explained in the patent applications incorporated by reference, speech-related event notifications may involve the detection of keywords. A keyword is a particular word, phrase, or logical construct of words that the SAM 120 detects in the speech of a call between an agent and a remote party. Depending on the circumstances, this detection may be related to the keyword being spoken by the agent, the remote party, or both. Generally speaking, keywords are examples of semantic speech characteristics.

However, in the present application, the scope of speech-related event notifications is broadened to include reporting the detection of non-semantic as well as semantic speech characteristics (or "indicators"). The reporting of a detected speech characteristic may also be referred to as an event. Thus, in particular embodiments, a one-to-one correlation may exist between the characteristic and the indicator, with the "indicator" referring more so to the protocol elements conveying the characteristic and the "event" referring more so to the speech characteristic itself. More detail about this distinction is provided further below.

Accordingly, an ASM 140 may receive various speech-related event notification messages for a call over signaling link 135 conveying indications of certain speech characteristics that the SAM 120 has detected in the speech of the call. For example, the SAM 120 may be configured to detect a particular word being spoken during the call (e.g., an event) and may generate a speech-related event notification message indicating the word was spoken by the agent and/or the remote party and convey this message over signaling path 125 to the EVHM 130. In this instance, the speech-related event notification message includes an indicator that the particular keyword has been spoken (e.g., the particular event has occurred) and in turn, the EVHM 130 is aware of which ASMs 140 exist and should receive the speech-related event notification message and forwards the message to the appropriate ASMs 140 accordingly. Similarly, the SAM 120 may report detecting a particular non-semantic speech characteristic, such as an emotion, and this indication is reported in a speech-related event notification message in much the same way as a semantic speech characteristic to the EVHM 130 and then to the appropriate ASMs 140.

Preferably, though not necessarily, the ASMs 140 are configured to interpret the various event notification messages they may receive and perform functionality accordingly. With that said, in particular embodiments, an ASM 140 never issues an error notification as a result of receiving an undefined event notification indicator. That is to say if an ASM 140 is configured to perform functionality as a result of a particular keyword being spoken and the ASM 140 receives a speech-related event notification message (e.g., an indicator) that a particular emotion has been detected, then it simply ignores the message.

An example illustrates this distinction. Consider two different SAMs 140 are configured to detect two different speech characteristics or events. The first event is a curse word uttered in anger by an agent to a remote party. The second event is an agent providing a proper greeting to a remote party. Thus, for the second event, the emotional speech characteristic is not relevant. In this instance, the first ASM 140, called the "angry-agent" ASM 140, handles speech-related event notification messages including indicators of detection of emotion and certain keywords (e.g., curse words). While the second ASM 140, called the "greeting-monitor" ASM 140, handles speech-related event notification messages including indicators of a proper greeting phrase.

When a call is established between an agent and a remote party, the EVHM 130 reports a call-related event notification message to both ASMs 140 for this event. Thus, each ASM 140 knows about the existence of a new call established between the agent and the remote party. When the SAM 120 detects a greeting used by the agent, it reports out a speech-related event notification message indicating detection of the greeting keyword and this event notification message may be provided to both ASMs 140. Accordingly, the angry-agent ASM 140 may simply ignore this event notification since it does not indicate the presence of an angry agent uttering a curse word. While the greeting-monitor ASM 140 determines whether the agent has complied with the greeting policy and may react appropriately, such as recording data indicating the agent has complied properly. Later on during the conversation, the agent utters a curse word in anger and the SAM 120 reports a second speech-related event notification message, but this time indicating the detection of a curse word uttered in anger. Again, the EVHN 130 forwards the speech-related event notification message to both ASMs 140. Accordingly, the angry-agent ASM 140 recognizes the reported indicators and reacts by issuing a visual warning (such as visual prompts and/or icons) over a signaling link 145 that is displayed on the computer used by the agent. While the greeting-monitor ASM 140 receives the reported indicators and simply ignores the message.

In the above example, the EVHM 130 simply replicates the event notification messages to the various ASMs 140. However, in other embodiments, the EVHM 130 may analyze the reported speech indicators in the event notification messages and only forward the messages to the appropriate ASMs 140. Therefore, such embodiments may require the EVHM 130 to maintain data on which ASMs 140 are to receive which event notification messages. While in other embodiments, the event notification messages may indicate which ASMs 140 are applicable and the EVHM 130 reads such indications from the messages and selectively forwards them accordingly. Thus, depending on the embodiment, the EVHM 130 may forward event notification messages indiscriminately, in which case the individual ASMs 140 are typically configured to appropriately ignore (or otherwise handle) irrelevant event notification messages, or the EVHM 130 may selectively forward event-notification messages, in which case the EVHM 130 may be configured to maintain or read information as to which ASMs 140 are to receive which event notification messages. For illustrations purposes, the examples presented later herein presume that the EVHM 130 provides a copy of each event notification message to each ASM 140 and the ASMs 140 ignore those event notification messages that are not relevant.

Returning now to the above example, the angry-agent SAM 120 is configured to report the detection of curse words uttered by the agent in anger. This is different than merely reporting detection of a curse word (e.g., a keyword) because the SAM 120 also provides an indicator of the emotion anger.

That is to say, the event or speech characteristic being detected is a curse word uttered in anger. In particular embodiments, the reporting of this event may involve providing separate indicators, a first one for the curse word and a second one for emotion anger in the event notification message. While in other embodiments, the reporting of this event may involve providing a single indicator in the event notification message that reflects a curse word uttered in anger.

Thus, the distinction between the speech characteristic detected and the indicator reported in the event notification message is that the elements included in the event notification message may comprise separate or integrated forms of data that may need to be processed by the ASM 140 to properly ascertain the particular characteristic. Table 1 illustrates possible examples.

TABLE 1

| Example | Reported Indicators | Meaning |
|---------|---------------------|---------|
| 1 | "XYZ" | A particular keyword (e.g., as represented by "XYZ") has been detected in the speech. |
| 2 | "XYZ, anger" | A particular keyword (XYZ) as well as the emotion anger has been detected. |
| 3 | "XYZA" | A particular keyword (XYZ) uttered in anger has been detected. |

In the examples, the elements provided in the event notification message reflect an indication that a particular keyword (e.g., "XYZ") was detected in the speech. However, depending on the circumstances, this indication could be defined as a particular word (e.g., "XYZ") or an indicator identifying a particular context. For example, the indicator "curse word" may reflect a context in which a curse word was detected without having to identify the particular curse word that was spoken by the agent.

Thus, the use of a context may be helpful in mapping several keywords to a common meaning. For example, a keyword may be defined to recognize when a caller says "yes" to a question. However, other callers may answer "yeah" or "sure," which is intended to mean the same as "yes." Thus, in this instance, it may be helpful to map the answers "yes," "yeah," and "sure" to a context of receiving a positive response from a caller and reporting an indicator of this context instead of the actual word spoken by the caller.

Further, returning to Table 1, the event notification message may report two indicators, a keyword (or context) followed by a separate non-semantic indicator. For instance, in the second example, the message indicators comprise "XYZ, anger," which identify the keyword XYZ was detected and the emotion anger was detected. While, in the third example, message indicators "XYZA" may be defined to correlating the detection of XYZ uttered in anger.

With that said, how a speech characteristic is reported as one or more indicators in an event notification message by the SAM 120 can vary from embodiment to embodiment, although using separate indicators for keywords and non-semantic speech characteristics can provide certain advantages in some embodiments. For instance, ASMs 140 can be configured to accommodate an evolving SAM 120 in a backwards compatible manner. That is to say, the ASMs 140 can be configured to easily accommodate situations in which the SAM 120 reports distinct indicators for newly detected speech characteristics, although the ASMs 140 do not necessarily recognize that these distinct indicators are being used for these newly detected speech characteristics. Accordingly, it may be desirable in these situations to define backwards compatibility for the ASMs 140 so that they can still function even if they do not recognize the indicators for the newly detected speech characteristics.

For example, an ASM 140 can be configured to ignore any indicators in an event notification message that the ASM 140 is not configured to react to. In this instance, the SAM 120 may be modified to now detect the emotion anger and to provide an indicator for this emotion in event notification messages when the emotion is detected in speech. Accordingly, when the ASM 140 receives a message that has this new indicator for an event detecting the emotion anger, the ASM 140 may simply ignore the indicator. Then at a later time, the ASM 140 may be augmented to handle this indicator if desired. This allows an evolutionary deployment architecture where the initial installation may involve a SAM 120 that only detects and reports certain speech characteristics (e.g., only semantic speech characteristics) and the ASMs 140 are only configured to act on these characteristics (e.g., only configured to act on semantic speech characteristics). However, at a later time, the SAM 120 may be updated to detect and report new speech characteristics (e.g., new non-semantic characteristics) and although the ASMs 140 do not necessarily recognize the indicators for these new speech characteristics, the ASMs 140 are not required to be upgraded at the same time to process the indicators for these new speech characteristics since the ASMs 140 can simply ignore them as unrecognized indicators.

Furthermore, in particular embodiments, the reporting of semantic and non-semantic indications may occur via separate event notification messages. Such a configuration can further facilitate the SAM 120 detecting and reporting independent speech characteristics in a more timely fashion since a configuration that only sends a single message with indicators for different speech characteristics may delay the reporting of the characteristics until all of the characteristics are known. Thus, depending on the embodiment, reporting separate characteristics via separate parameters (e.g., indicators) in event notification messages can involve sending either one event notification message with multiple indicators or multiple event notification messages with each message having a single indicator. Therefore, depending on the circumstances, an event notification message received by an ASM 140 may include one or more indicators for one or more call-related and/or speech-related events that may reflect, for example, the establishment of a call, the termination of a call, a detected keyword or context, and/or a non-semantic speech characteristic (e.g., agent, emotion, gender, etc.).

Finally, with respect to indicators for non-semantic speech characteristics, various related information may be provided along with a number of these indicators in event notification messages. For example, an indicator of gender may simply indicate male, female, or unknown. While in other instances, the indicator may also include a confidence level. As those skilled in the art of protocol design can appreciate, different developers of speech analytics engines may develop a variety of message protocols, syntax, and/or structures that may evolve over time that can be defined to convey information to the ASMs 140.

Multiple Speech Analytics Engines

Figure 2A:
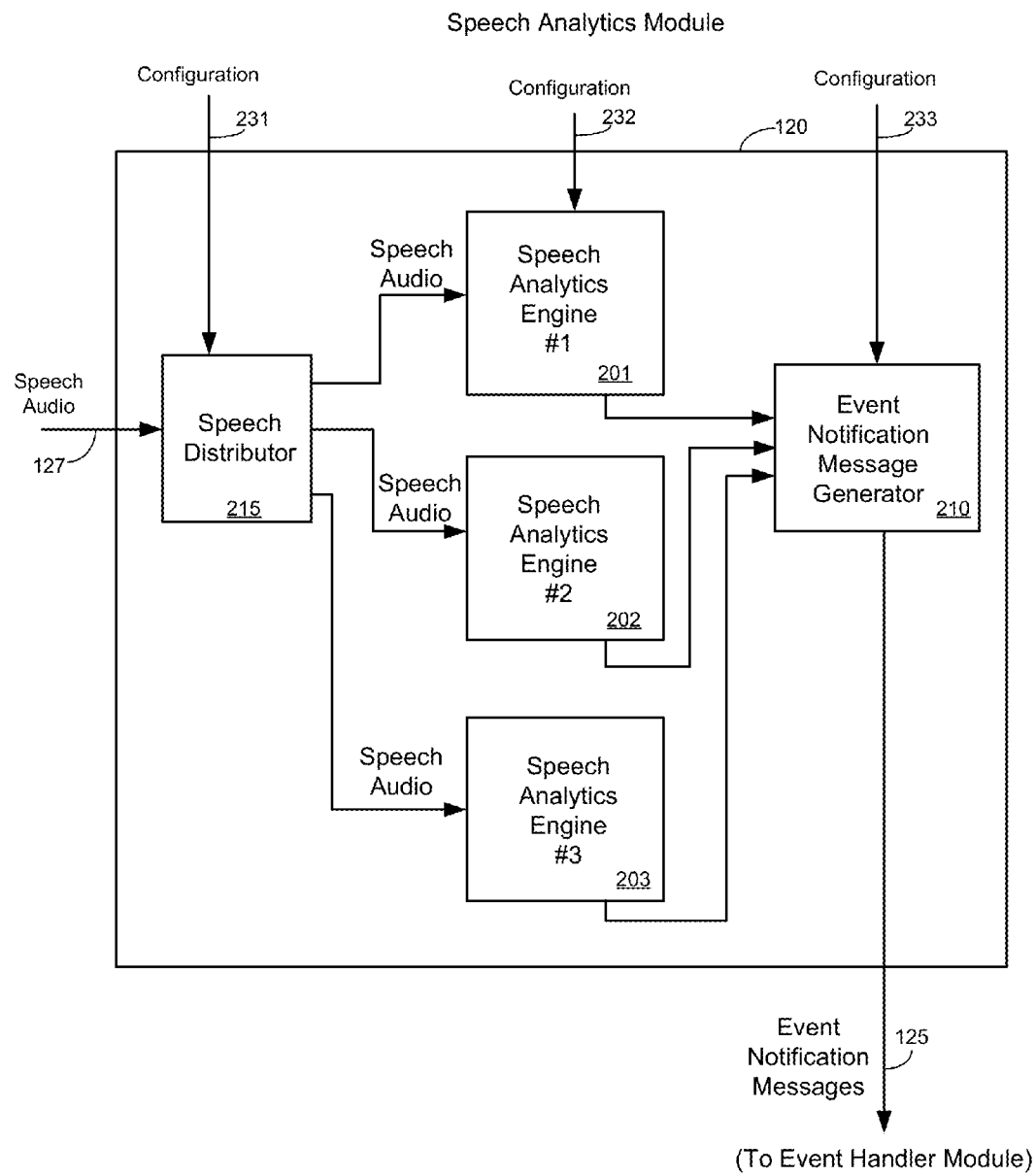
FIGS. 2A-2C illustrate various embodiments of a speech analytics module for processing speech audio using multiple speech analytics engines according to the various technologies and concepts disclosed herein.

In various embodiments, the SAM 120 may comprise multiple speech analytics engines ("SAEs") such as the embodiment shown in FIG. 2A that comprises SAE #1 201, SAE #2 202, and SAE #3 203. In this instance, SAE #1 201 is configured to detect semantic speech characteristics such as keywords, SAE #2 202 is configured to detect a particular non-semantic speech characteristic such as emotion, and SAE #3 203 is configured to detect another non-semantic speech characteristic such as age or gender.

Depending on the circumstances, these SAEs 201, 202, 203 may each be a separately licensed software module that is executed on a common processor or different processors. For instance, an operator may be operating the SAM 120 with a licensed SAE from a first vendor for detection of semantic characteristics (e.g., keywords) and may later augment their platform by adding a licensed software module from another vendor as a separate SAE that detects non-semantic characteristics (e.g., emotions). Accordingly, a number of different SAEs could be accommodated over time that would allow the operator to augment their SAM 120 capabilities by incorporating additional SAE modules. Thus, it should apparent to those of ordinary skill in the art that a SAM 120 may include any number of different SAEs depending on the semantic and non-semantic speech characteristics desired.

As previously explained, depending on the embodiment, speech audio may be received either as one or two audio streams on a call leg 127 from the call handler 150. In this instance, the speech audio is received by a speech distributor 215 that provides a copy of the speech audio (e.g., audio data) to one or more of the SAEs 201, 202, 203 as appropriate. For example, in FIG. 2A, a copy of the audio is provided to each of the SAEs 201, 202, 203 in parallel, although in other instances copies of the audio may only be provided to a subset of the SAEs 201, 202, 203. Accordingly, by providing copies of the audio to each SAE 201, 202, 203 in parallel, the SAEs 201, 202, 203 can begin processing the audio at substantially the same time and as a result, processing by a first SAE 201, 202, 203 does not delay a second SAE 201, 202, 203 from beginning processing due to waiting for the first SAE 201, 202, 203 to complete its processing.

As for the embodiment of the SAM 120 shown in FIG. 2A, each SAE 201, 202, 203 provides its corresponding indicator of a detected speech characteristic to an event notification message generator ("ENMG") 210. For instance, SAE #1 201 may provide an indicator of a semantic-based characteristic such as a keyword, SAE #2 202 may provide an indicator of a non-semantic-based characteristic such as an emotion, and SAE #3 203 may provide an indicator of another non-semantic-based characteristic such as gender or age. In turn, the ENMG 210 may generate one or more event notification message(s) based on the received indicators and then provide the message(s) to the EVHM 130 using signaling link 125.

In addition, depending on the embodiment, the ENMG 210 may provide various functions. For instance, in one embodiment, the ENMG 210 provides multiplexing functionality whereby the indicators received from the SAEs 201, 202, 203 are multiplexed as separate event notification messages onto the signaling link 125. While in another embodiment, the ENMG 210 provides functionality to buffer indicators from different SAEs 201, 202, 203 so that a single event notification message can be sent that includes two or more indicators instead of a single event notification message being sent for each indicator.

Further, in various embodiments, the ENMG 210 may also perform protocol conversions on the indicators. For instance, the indicators provided by the SAEs 201, 202, 203 may be in different formats or structures and the ENMG 210 provides functionality to convert the indicators into a common protocol. That is to say, it may be expected that the various sources (e.g., vendors) of the SAEs 201, 202, 203 may output indicators in different protocols and as a result, the ENMG 210 is required to convert the indicators into a common protocol that may be used in event notification messages. Thus, in particular embodiments, the ENMG 210 may provide functionality to facilitate replacing existing SAEs or adding new SAEs and to allow the indicators provided by these replaced or new SAEs to conform to expected event notification message protocol. As a result, such functionality may allow the replacement or addition of a SAE to be transparent to the EVHN 130 and corresponding ASMs 140.

In various embodiments, different configuration inputs may also be provided to the SAM 120 to control how the SAM 120 operates. For instance, in particular embodiments, speech distributor configuration input 231 is provided to define how the speech distributor 215 distributes speech audio to the different SAEs 201, 202, 203. This is because it may be appropriate to provide speech audio for certain calls only to certain SAEs 201, 202, 203. For example, an outbound campaign may require the agents conducting the campaign to provide a specific greeting upon a remote party answering an outbound call. Thus, for this campaign, only semantic processing may be needed to determine whether an agent on a particular outbound call has used the required greeting and accordingly, only SAE #1 201 configured to detect semantic speech characteristics may be needed to process the speech audio of the outbound calls made for the campaign. Accordingly, the speech distributor configuration input 231 may provide the speech distributor 210 with instructions to send speech audio for the outbound calls of this campaign only to SAE #1 201.

Similarly, in particular embodiments, speech analytics configuration input 232 is provided to the SAEs 201, 202, 203 to define what characteristics are to be detected. For instance, returning to the example involving the required greeting for the outbound campaign, SAE #1 201 must be configured to be able to detect the required greeting. For example, SAE #1 201 must be instructed on what keywords to search for in the speech audio of the calls for the outbound campaign that indicate the agents have used the required greeting. Accordingly, the speech analytics configuration input 232 may provide instructions to the SAE #1 201 on what keywords to search for in the speech audio of the calls for the outbound campaign.

Finally, in particular embodiments, conversion configuration input 233 is provided to the ENMG 210 to define what conversions must take place with respect to the indicators received from the various SAEs 201, 202, 203. For example, assume SAE #3 203 provides a gender indicator to the ENMG 210 in the form of "male," "female," or "unknown." However, at a later time, the operator deploys a replacement SAE for SAE #3 203 that is more accurate and this replacement SAE provides an indicator in the form of "male" or "female" along with a confidence value. As a result, the ENMG 210 may need to be re-configured to handle this new output being provided by the replacement SAE. For example, the operator may want the ENMG 210 to convert the new output to the male/female/unknown format by converting any male or female indicator with a confidence value below fifty percent to "unknown." Thus, the conversion configuration data 233 may provide the ENMG 210 with instructions on how to process the new output from the replacement SAE into the male/female/unknown format.

Finally, as previously mentioned, the embodiment of the SAM 120 shown in FIG. 2A is based on a parallel processing architecture that may offer faster processing speed. However depending on the circumstances, the indicators provided by the different SAEs 201, 202, 203 may not necessarily be provided to the ENMG 210 at the same time. Thus, in instances in which the ENMG 210 is configured to provide a single event notification message with multiple indicators, buffering of the indicators provided by the different SAEs 201, 202, 203 may be required.

Figure 2B:
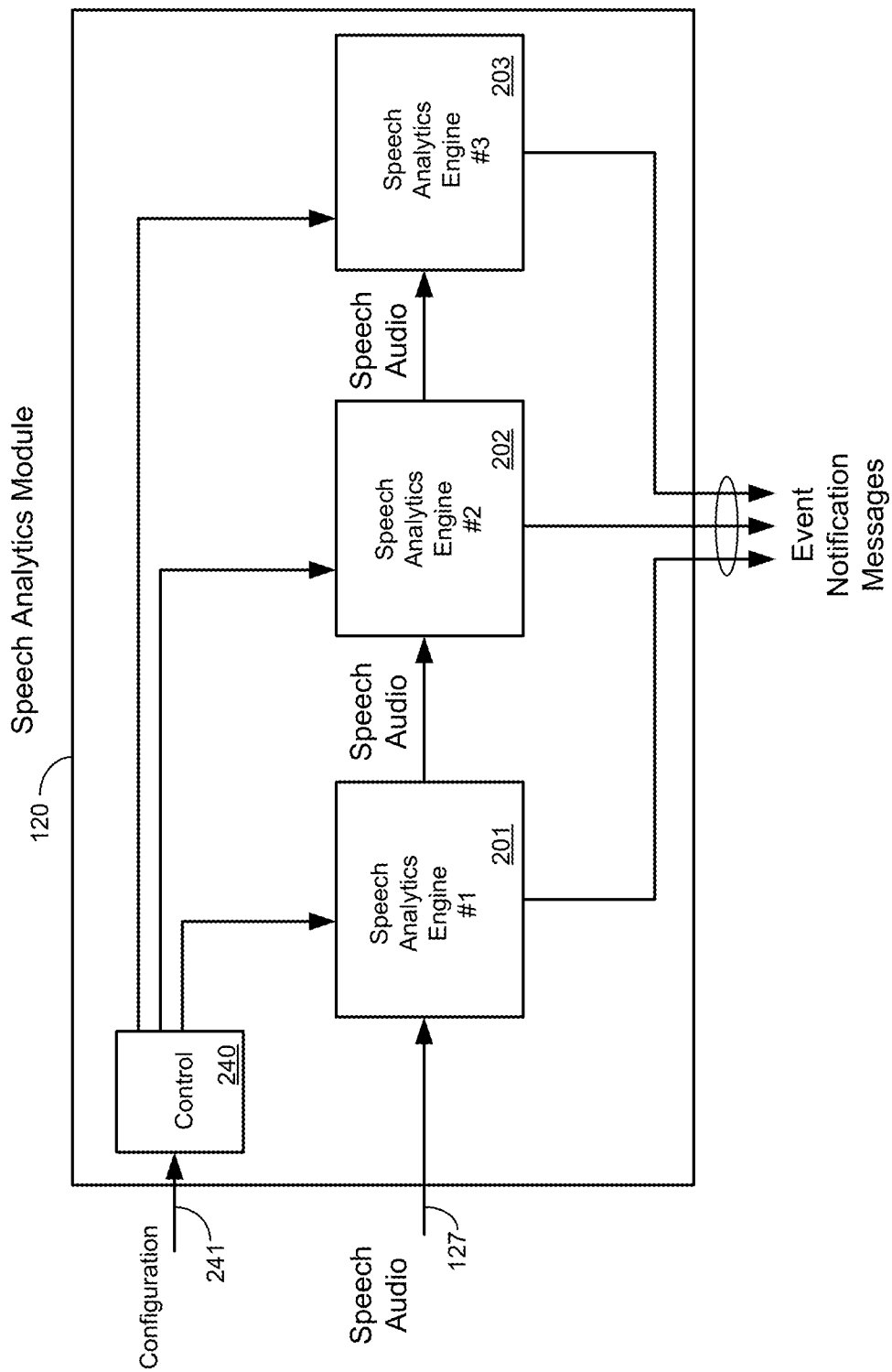

Turning now to FIG. 2B, the embodiment of the SAM 120 shown in this figure is based on serial processing of the speech audio (e.g., audio data). In this embodiment, the SAM 120 again comprises several SAEs 201, 202, 203 and the speech audio again comprises one or more audio streams that are received on a call leg 127. In this instance, the speech audio is first received by SAE #1 201, then received by SAE #2 202, and finally received by SAE #3 203. Accordingly as the speech audio is received by the individual SAEs 201, 202, 203, each SAE processes the speech audio as appropriate. That is to say that in certain circumstances the speech audio may not be required to be processed by a particular SAE and the configuration input 241 provided to the control unit 240 may simply instruct the particular SAE to ignore and pass the speech audio as appropriate. While in other embodiments, each SAE 201, 202, 203 may simply process the speech audio without regard as to whether the processing provided by a particular SAE 201, 202, 203 is required or not. Accordingly, the SAEs 201, 202, 203 provide their corresponding indicators and one or more event notification messages are generated based on the indicators and passed in a manner similar to, for example, how the ENMG 210 described in FIG. 2A generates and passes such messages. In instances in which indicators may be provided in the event notification message(s) that are not necessarily needed by a particular ASM 140, the ASM 140 may simply discard the un-needed indicators.

Figure 2C:
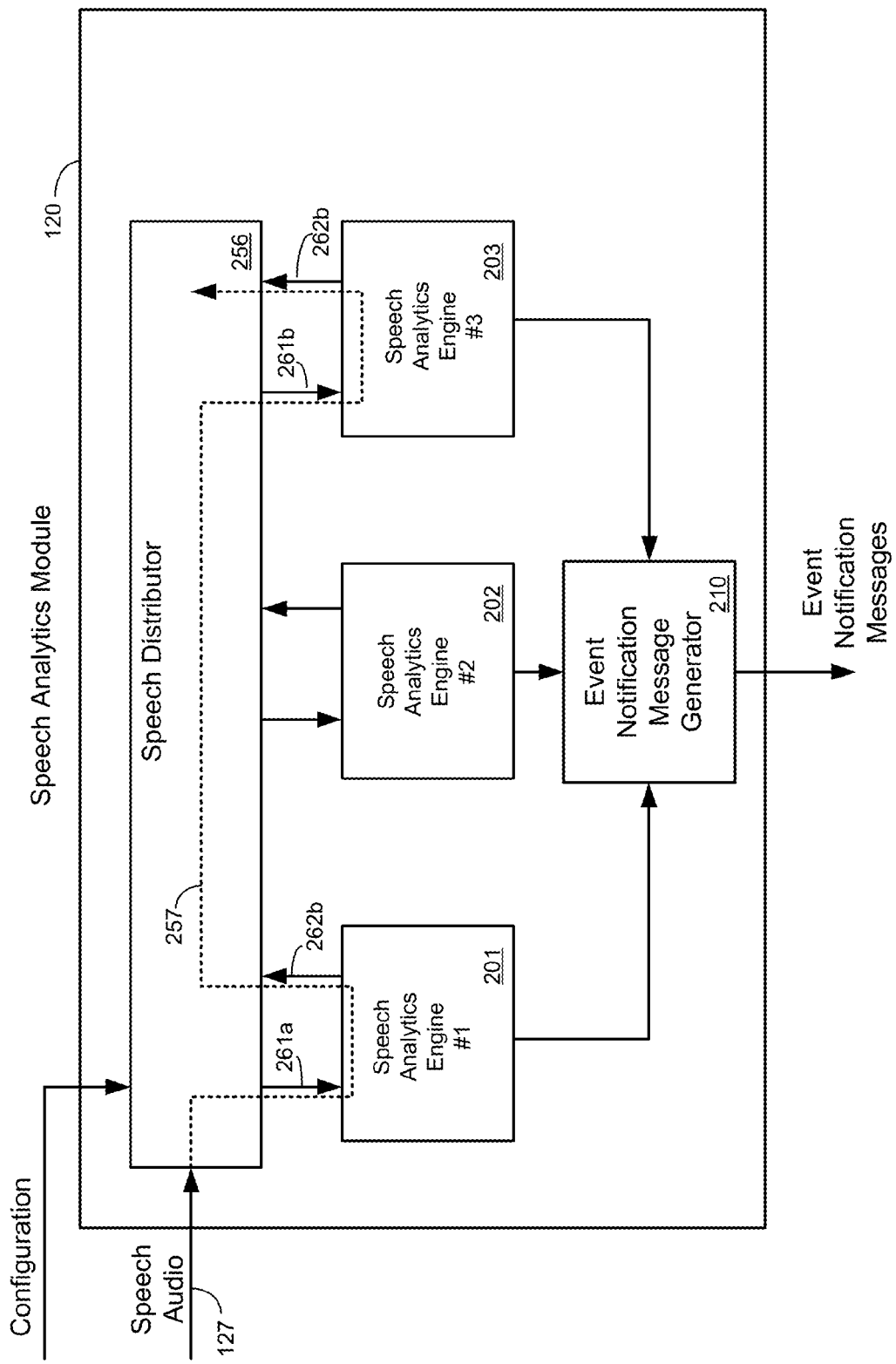

Finally, another variation of the SAM 120 is shown in FIG. 2C involving another form of serial processing. In this embodiment, a speech distributor 256 receives and distributes speech audio in a serial manner to each SAE 201, 202, 203 by serially passing the speech audio to and from the speech distributor 256, which in turn serially passes the speech audio to and from different SAEs 201, 202, 203 as appropriate. This is represented by the dotted line 257 shown in FIG. 2C that comprises a stream of speech audio that is initially received at the call leg 127, passed to and from SAE #1 201 and then passed to and from SAE #3 203. For this embodiment, the speech distributor 256 determines which SAEs 201, 202, 203 are to receive and process the speech audio. For example, the speech distributor 256 initially provides the speech audio on link 261a to SAE #1 201. SAE #1 201 processes the speech audio and passes the audio out over link 262b back to the speech distributor 256. SAE #1 201 may buffer the speech audio, if necessary, before passing it back out to the speech distributor 256. Next, the speech distributor 256 provides the speech audio to SAE #3 203 over link 261b and receives it back from SAE #3 203 over link 262b. Since the speech audio is not required to be passed to any other SAE, the information flow may stop. In this manner, the speech audio is serially transmitted to the various SAEs 201, 202, 203 as appropriate for the call. Accordingly, each SAE 201, 202, 203 provides a corresponding indicator to the event notification message generator 210, which ensures that the corresponding event notification messages are provided to the EVHM 130 in the expected format.

It is expected that other architectures can be defined in light of the above disclosure for incorporating multiple SAEs in a SAM 120 to provide the appropriate semantic and non-semantic speech-related event notification messages. Thus, it should be appreciated by those of ordinary skill in the art that there are various other architectures of multiple SAEs processing speech audio that may be configured and that the configurations provided in FIGS. 2A to 2C should not be construed to limit the scope of the invention.

Process Flows

The logical operations described herein may be implemented (1) as a sequence of computer acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

In light of the components of the SAS 155 and their functions described above, various embodiments of process flows associated with these components are now described. The process flows are described in the context of the SAM 120, the EVHM 130, and a particular ASM 140. It should be recognized that various embodiments may incorporate various process flows within each module, and as long as the communication between modules is in an expected format, the process flows within each component may vary to some degree without impacting the other modules.

Figure 3A:
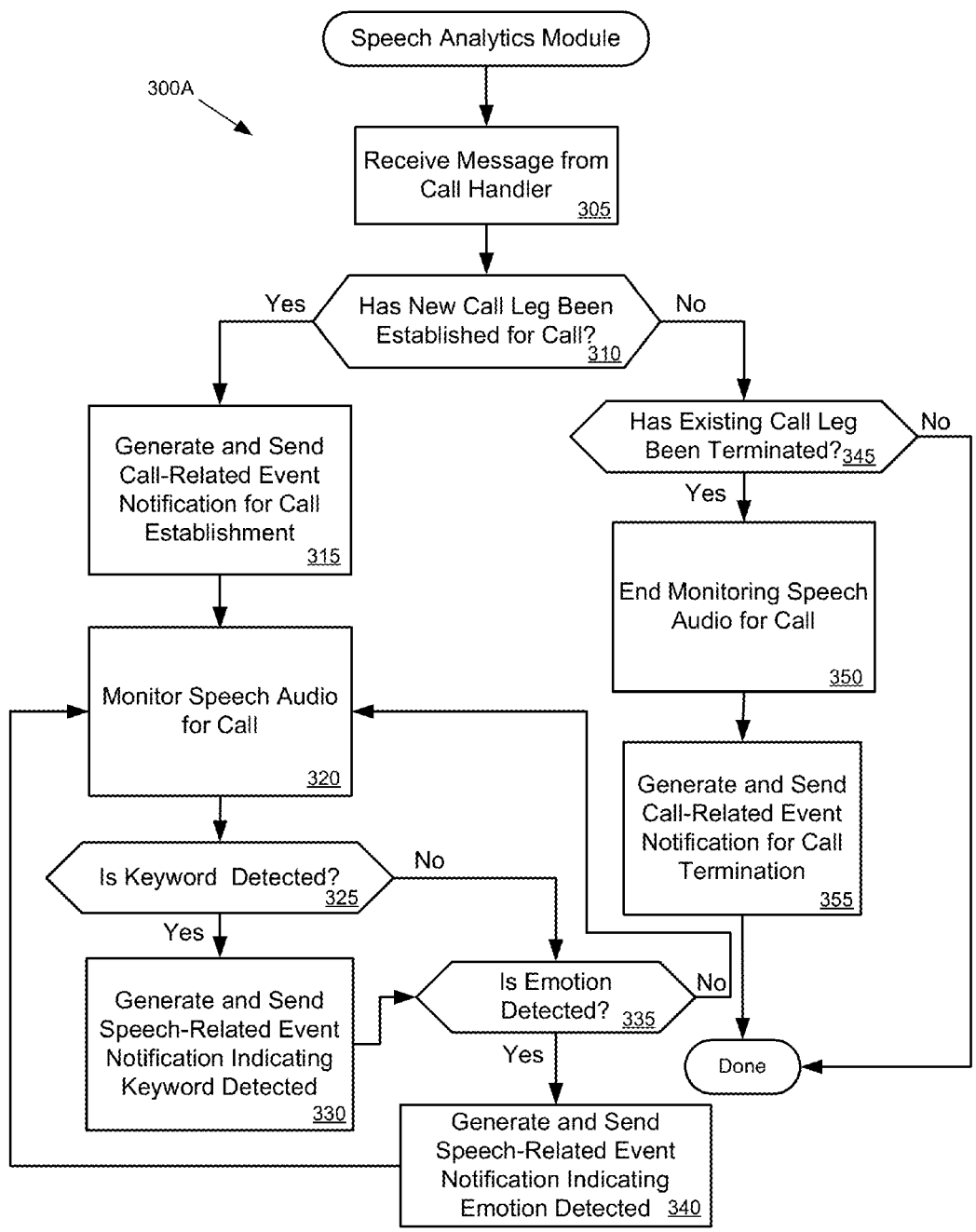
FIGS. 3A-3B illustrate process flows that may be executed by a speech analytics module according to various embodiments of the invention.

Turning first to FIG. 3A, a process flow associated with the SAM 120 is presented. It should be recognized that the process flows may vary according to the architecture of the SAM 120 used. In the case of FIG. 3A, the process flow corresponds to a serial architecture in which a first SAE processes speech audio to detect a semantic characteristic (e.g., a keyword) and then a second SAE processes the same speech audio to detect a non-semantic characteristic (e.g., an emotion).

The process 300A begins with the SAM 120 receiving a message from the call handler 150 in operation 305. In response, the SAM 120 first determines whether the message received from the call handler 150 indicates a new call leg 127 has been established for a call in operation 310. As previously discussed, in various embodiments, in order for the SAM 120 to able to monitor a call between an agent and a remote party, a call leg 127 for the call must first be established between the call hander 150 and the SAS 155. Depending on the embodiment, the call handler 150 or SAS 155 may establish the call leg 127 for the call. Thus, the message received by the SAM 120 from the call handler 150 may indicate a call leg 127 has been established for a call or may indicate that a call leg 127 needs to be established for the call. In addition, the message may also provide an identifier for the call and/or an identifier for the particular call leg 127 established for the call so that the SAM 120 is aware of the particular call and/or the call leg 127 established for the call for purposes of monitoring the call.

If the SAM 120 determines a new call leg 127 has been established for a call, then the SAM 120 generates and sends a call-related event notification message to the EVHM 130 indicating the same in operation 315. In instances in which the SAS 155 may need to establish the new call leg 127, although not shown in FIG. 3A, the SAM 120 may carry out this task prior to sending the call-related event notification message to the EVHM 130.

At this point, the SAM 120 begins to monitor the speech audio for the call on the established call leg 127 in operation 320. Thus, in this example, the SAM 120 includes a first SAE to monitor the speech audio to detect a keyword spoken by the agent and/or the remote party and a second SAE to monitor the speech audio to detect the emotion anger displayed by the agent and/or the remote party.

Accordingly, in operation 325, the SAM 120 determines whether a keyword has been detected by the first SAE. For instance, in particular embodiments, the first SAE detects a keyword in the speech audio and provides an indicator for the keyword to the SAM 120. Thus, if an indicator for a keyword has been provided to the SAM 120, then the SAM 120 generates a speech-related event notification message reporting the detection of the keyword and sends the message to the EVHM 130 in operation 330.

Once the SAM 120 has determined whether a keyword has been detected, the SAM 120 next determines whether the emotion anger has been detected by the second SAE in operation 335. Again, similar to the first SAE, the second SAE in particular embodiments provides an indicator for the emotion anger to the SAM 120 as a result of detecting the emotion in the speech audio of the call. Therefore, if an indicator for the emotion anger has been provided to the SAM 120, then the SAM 120 generates a speech-related event notification message reporting the detection of the emotion anger and sends the message to the EVHM 130 in operation 340. It should be noted that the speech-related event notification message may include additional information depending on the embodiment. For instance, the message may also include an identifier for the call being monitored so that the EVHM 130 and corresponding ASMs 140 are aware of which call the speech characteristic was detected in. Once the message has been sent, the SAM 120 returns to monitoring the speech audio for the call in operation 320.

Returning now to operation 310, if instead the SAM 120 determines that no new call leg 127 has been established for a call, then the SAM 120 determines whether an existing call leg 127 for a call has been terminated in operation 345. For instance, a call between an agent and a remote party may have wrapped up and ended accordingly. As a result, the call handler 150 may terminate the call leg 127 associated with the call and send a message to the SAM 120 indicating the termination of the call leg 127. Depending on the embodiment, besides informing the SAM 120 that the call leg 127 has been terminated, the message may also provide information so that the SAM 120 can identify the call and/or the call leg 127 associated with the message.

It should be noted that depending on the embodiment just like establishing a call leg 127 for a call, the call handler 150 or the SAS 155 may actually terminate the call leg 127 associated with a call upon the call ending between an agent and a remote party. Thus, the message received from the call handler 150 may inform the SAM 120 that the call leg 127 has been terminated or that the call leg 127 should be terminated. In instances in which the call handler 150 terminates the call leg 127, if the SAM 120 determines a call leg 127 has been terminated, then the SAM 120 simply stops monitoring the already terminated call leg 127 in operation 350. It should be noted that in particular embodiments, a message indicating a call leg 127 has been terminated may not be needed to inform the SAM 120 of such since the SAM 120 may automatically detect that the call leg 127 has been terminated and thus monitoring of the speech audio on the call leg 127 is no longer needed.

In instances in which the call handler 150 informs the SAM 120 that the call leg 127 should be terminated, then the SAM 120 stops monitoring the speech audio for the call leg 127 and terminates the call leg 127 in operation 350. Finally, the SAM 120 generates and sends an appropriate call-related event notification to the EVHM 130 indicating the same in operation 355. Accordingly, the EVHM 130 may forward the message to the appropriate ASMs 140 informing these ASMs 140 that the call has ended and/or the corresponding call leg 127 has been terminated.

Figure 3B:
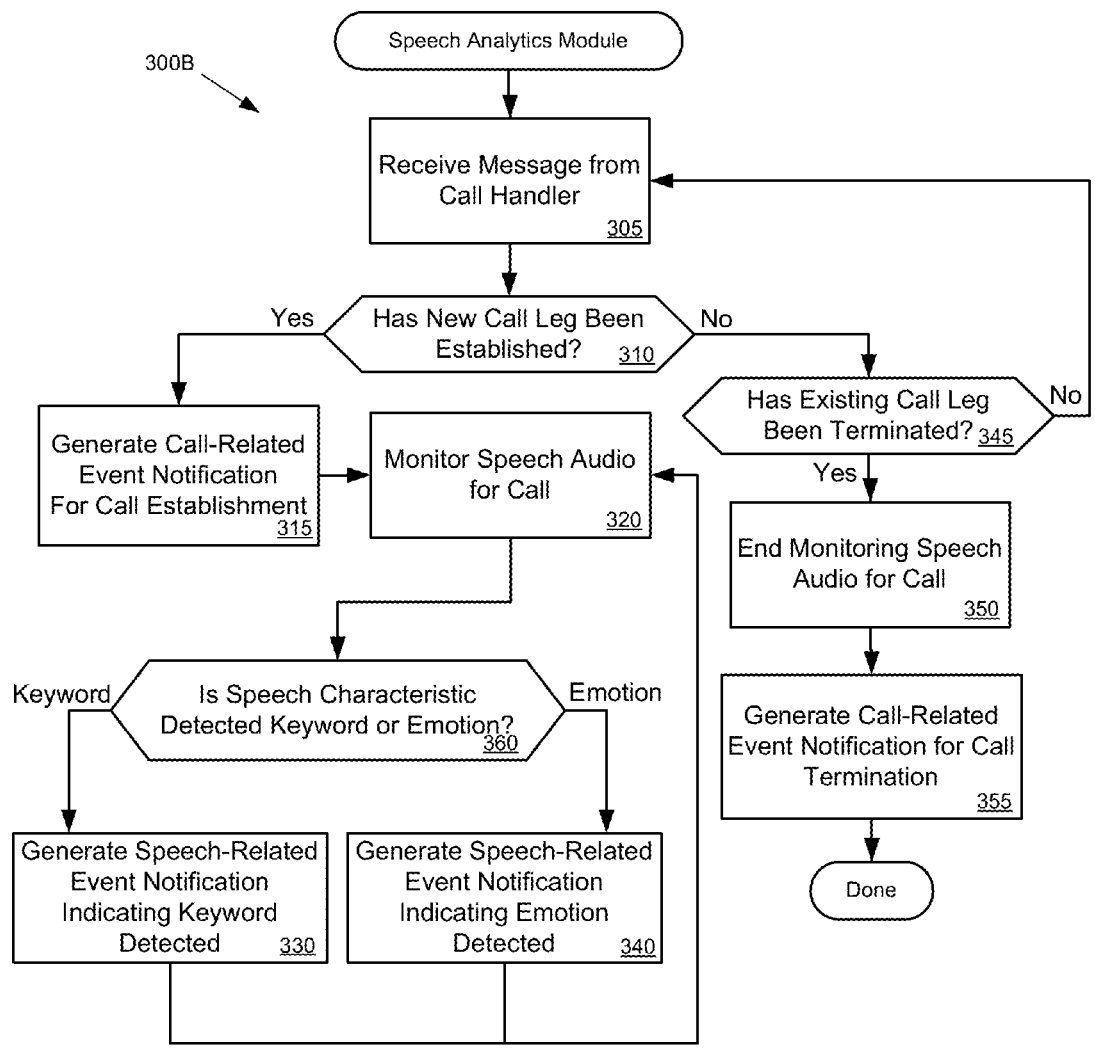

A process flow shown in FIG. 3B represents a potential process flow for a SAM 120 that implements parallel speech processing SAEs. In this embodiment, operations 305-355 for the process 300B shown in FIG. 3B are the same as the corresponding operations described in FIG. 3A, with a difference in processing appearing in operation 360. At operation 360, the SAM 120 receives an indication (e.g., an indicator) and determines whether the semantic SAE or the non-semantic SAE has detected a particular characteristic in the speech audio of the call. If the semantic SAE has detected a semantic characteristic (e.g., a keyword), then the SAM 120 generates and sends a semantic speech-related event notification message indicating the keyword in operation 330. If the non-semantic SAE has detected a non-semantic characteristic (e.g., the emotion anger), then the SAM 120 generates and sends a speech-related event notification message indicating the emotion anger in operation 340.

Figure 4:
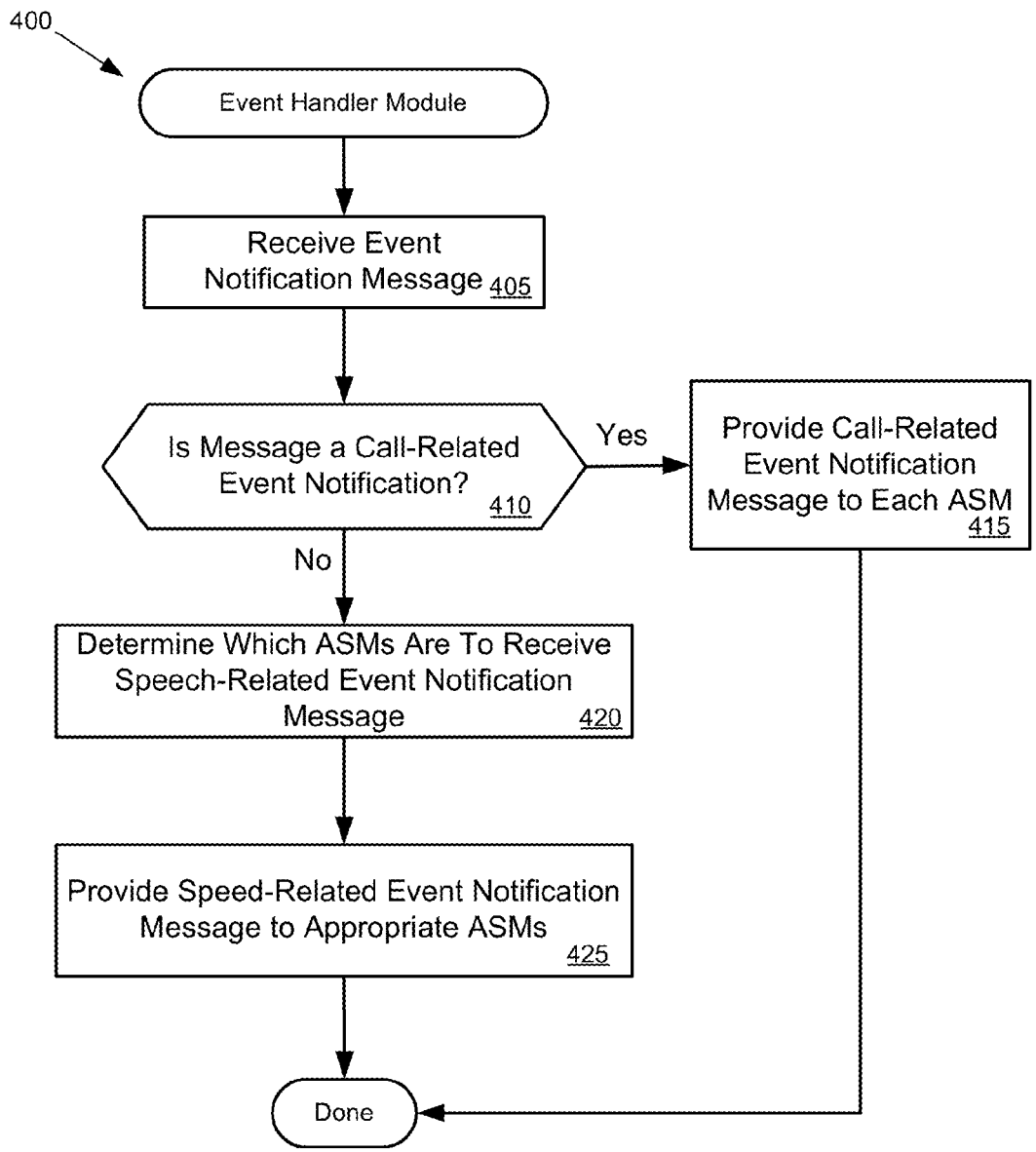
FIG. 4 illustrates a process flow that may be executed by an event handler module according to various embodiments of the invention.

A process flow for the EVHM 130 is shown in FIG. 4. For this embodiment, the process 400 mainly involves receiving various forms of event notification messages and forwarding them as appropriate. The process 400 begins with the EVHM 130 receiving an event notification message in operation 405. At this point, the EVHM 130 determines if the message is call-related in operation 410. If the event notification message is call-related, then the EVHM 140 provides a copy of the message to each ASM 140 in operation 415. For this embodiment, this operation is performed because presumably in most cases, each ASM 140 will need to know about any call-related activities for the various calls being handled by the contact center such as the creation and termination of calls and corresponding call legs 127 between the call handler 150 and SAS 155.

If the event notification message is not call-related, then it is presumed to be speech-related. In such instances, the EVHM 130 determines the appropriate ASMs 140 to receive the message in operation 420. For example, a particular ASM 140 may only process semantic event notification messages and therefore, the EVHM 130 does not need to forward non-semantic event notification messages to the particular ASM 140. Once the appropriate ASMs 140 are determined to receive the event notification message, then the EVHM 130 provides the event notification message to the appropriate ASMs 140 in operation 425.

It is noted that in particular embodiments, the EVHM 130 may simply forward each speech-related event notification message to each ASM 140. Thus, for these particular embodiments, the EVHM 130 does not need to determine whether a received event notification message is call-related or speech-related or which ASMs 140 should receive a particular speech-related event notification message since both types of messages are provided to all of the ASMs 140. If a particular ASM 140 receives a message that it does not need to process, then the particular ASM 140 may simply disregard the message.

Figure 5A:
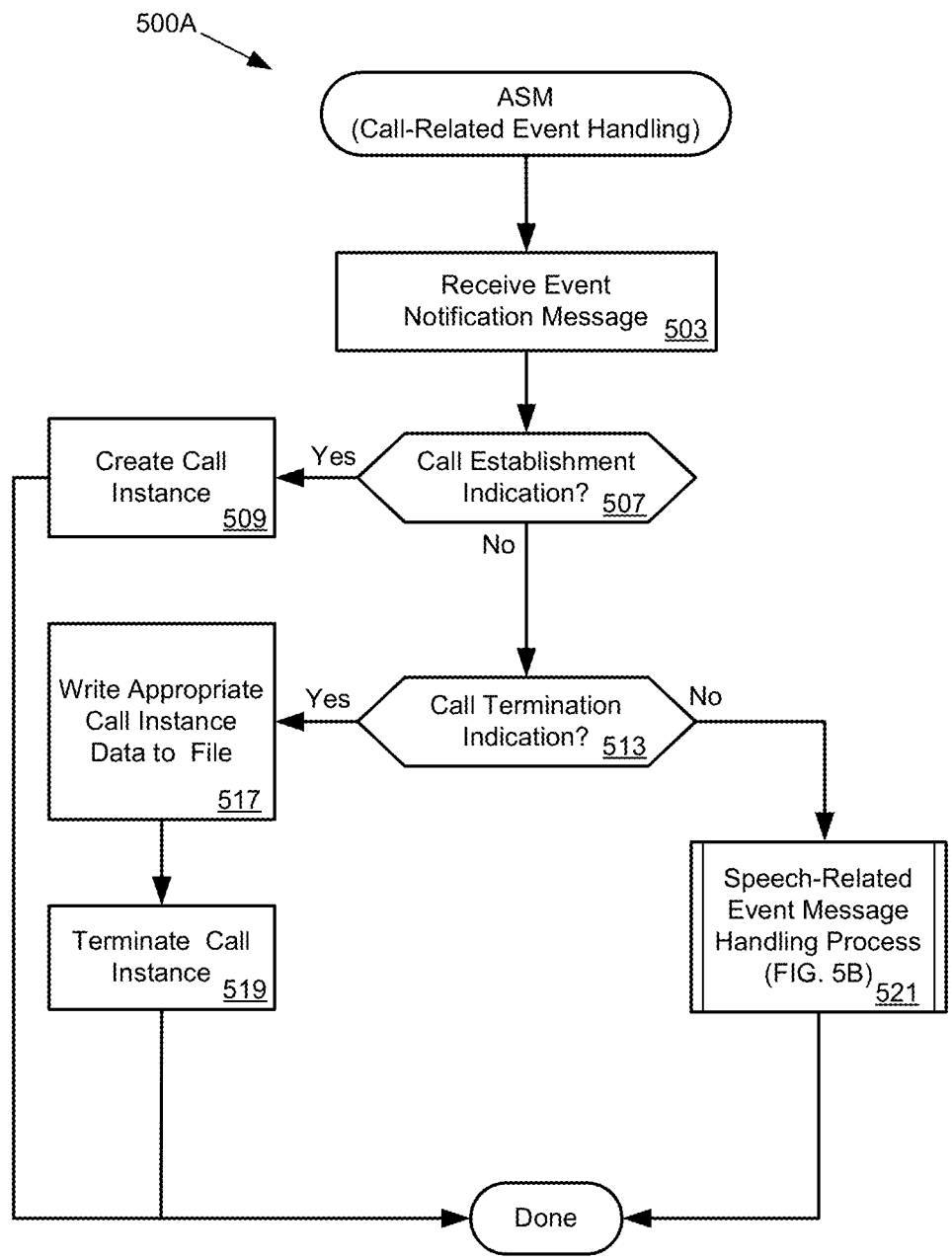
FIGS. 5A-5B illustrate a process flow that may be executed by an application specific module according to various embodiments of the invention.
Figure 5B:
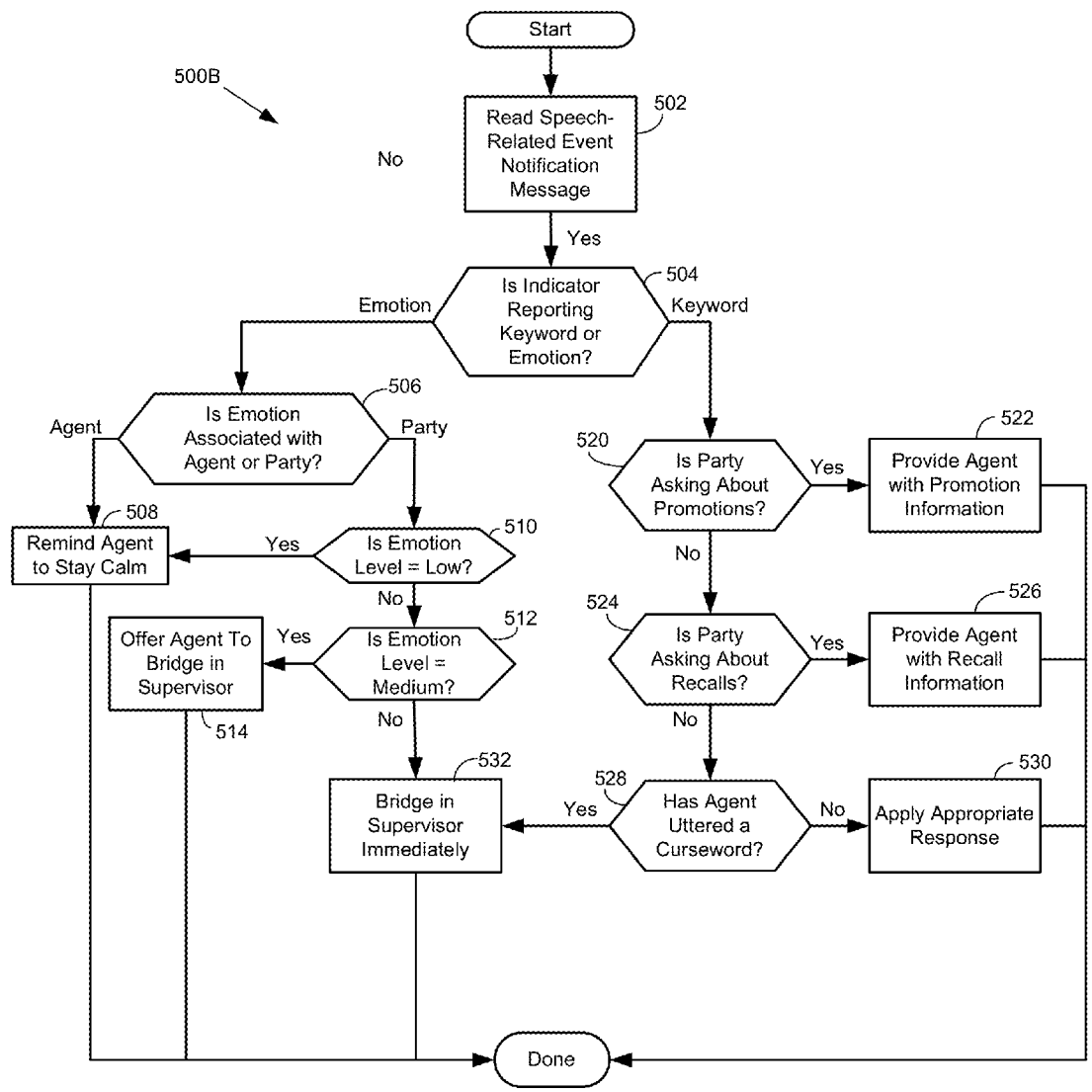

Continuing on, the operation of a particular ASM 140 is illustrated in FIGS. 5A-5B. In general, the process flow of any ASM 140 is mostly dependent on the particular application the ASM 140 is configured to carry out. Thus, a variety of process flows may be designed based on a variety of desired applications. However, in this example, the application of the particular ASM 140 illustrated in FIGS. 5A-5B is designed largely to illustrate how an ASM 140 can utilize both semantic and non-semantic event notification messages. The service aspects are discussed first.

The service illustrated by the process flow shown in FIGS. 2A-2B requires the monitoring of a call between an agent and a remote party for several events. A first event requires the speech audio of the call to be monitored to determine if the remote party is inquiring about any recent promotions and/or product recalls. Accordingly, promotions and/or product recalls may typically change from week-to-week and the ASM 140 may be configured to present information to an agent on a call regarding current promotions and/or product recalls if a remote party on the call is inquiring about such. For this service, information on current promotions and/or product recalls may be provided to the agent's computer via a pop-up window and presented, for example, as a list of current promotions and/or product recalls on the window. This event provides an example of monitoring the speech audio of a call to detect semantic characteristics such as, for example, the keywords "recall" or "sale" being spoken by the remote party.

In addition, a second event requires the speech audio of the call to be monitored to ascertain if the agent on the call utters a curse word. In this instance, the contact center may have a policy that agents should never utter curse words to a remote party, and if detected, a supervisor should be bridged into the call immediately. Again, this event provides an example of monitoring the speech audio of a call to detect semantic characteristics such as, for example, any keywords that are considered curse words.

Finally, a third event requires the speech audio of the call to be monitored for extreme emotional characteristics such as anger. Accordingly, if the agent and/or remote party on the call become emotional above designed thresholds, then different actions may occur based on one of three different threshold levels defined for the emotion. For instance, if the agent's emotion exceeds a low level, then this may result in prompting the agent to stay calm by providing a pop-up on the agent's screen. Further, there may be a tendency for the agent to react to an emotional caller by becoming emotional themselves. Therefore, if the remote party's emotion exceeds a medium level, then the agent may be prompted with an offer for the system to bridge in a supervisor to monitor the call and/or assist the agent. Finally, if the remote party's emotion reaches or exceeds a high level, then the system may automatically bridge in the supervisor without first prompting the agent. This event provides an example of monitoring the speech audio of a call to detect non-semantic characteristics such as, for example, the emotion anger from the speech audio of the call.

Turning now to FIGS. 5A and 5B, the process flow for the particular ASM 140 shown in these figures is divided into a first process flow for handling call-related event notification messages shown in FIG. 5A and a second process flow for handling speech-related event notification messages shown in FIG. 5B. It is noted that in many instances, it may be necessary that a call-related event notification message for a particular call (e.g., pertaining to establishment of a call leg 127) be received and processed by the ASM 140 before any speech-related event notification messages received by the ASM 140 for the call can be properly processed.

Thus, turning first to FIG. 5A, the process 500A begins with the ASM 140 receiving an event notification message in operation 503. The ASM 140 initially determines whether the message received is a call-related event notification message indicating establishment of a call leg 127 in operation 507. If so, then the process 500A proceeds to operation 509 where the ASM 140 creates a call instance for the particular call leg 127 and corresponding call. Depending on the embodiment, the call instance may be associated with the call leg 127 and corresponding call by using a reference identifier, a telephone number, or some other similar form of call identifier. Further, in particular embodiments, the creation of the call instance results in generating and initializing a data structure that is stored, and may further include the audio stream identifiers of the agent and remote party. Typically, the call instance data structure is defined by the particular ASM 140 and is unique relative to other call instance data structures generated by other ASMs 140.

If the event notification message is not a call-related event notification message indicating establishment of a call leg 127, then the ASM 140 determines whether the event notification message is a call-related event notification message indicating the termination of a call leg 127 and corresponding call in operation 513. If so, then the process 500A continues to operation 517 where the ASM 140 saves (if desired) any appropriate data stored in the call instance by writing the data to a file (e.g., an agent compliance file) or some other type of non-volatile storage structure. Saving the call instance data retains the desired information of the audio context so that it can be reviewed later if desired. For example, each occurrence of an event notification message received for the call along with information about a time, agent, context, etc. could be stored. This would allow administrators to review potential problems or issues with the call if desired. After the appropriate call instance data has been saved, the ASM 140 terminates the call instance data structure in operation 519.

If the event notification message is not a call-related event notification message indicating the termination of a call leg 127 in operation 513, then the process 500A continues by presuming the event notification message is for a speech-related event. Accordingly, the ASM 140 performs operation 521 that reflects the processing of a speech-related event as detailed in FIG. 5B.

It should be noted that the call-related event notification process flow shown in FIG. 5A is somewhat generic for the different types of ASMs 140 that can be defined in a SAS 155. For instance, regardless of an ASM's 140 purpose the ASM 140 usually creates a call instance in response to receiving a call-related event notification message indicating establishment of a call leg 127. Once the ASM 140 has created a call instance, then any data generated during the call may be reflected in the call instance and saved when the call is ended. In some instances, there may not be any intervening speech-related event notification messages received for the call before the call is ended so there may not be any changes to the call instance during the call. Thus, a call instance for a particular call may be generated and erased without any speech-related event notification messages ever being received by the ASM 140 for the call. This could be the case because the SAM 120 never detected any particular semantic or non-semantic speech characteristics in the speech audio that were applicable to the ASM 140 during the call.

Turning now to FIG. 5B, a process flow is illustrated that describes the above-mentioned service aspects (e.g., events) in relation to processing semantic and non-semantic speech-related event notification messages. As you may recall in the example, the service aspects provided by this particular ASM 140 involve determining whether the remote party on a call is inquiring about any recent promotions and/or product recalls, determining whether the agent on a call has utter a curse word, and determining whether the agent and/or the remote party on a call display anger.

In this particular embodiment, the process 500B begins with the ASM 140 reading the speech-related event notification message in operation 502. Once the ASM 140 has read the message, the ASM 140 determines whether the indicator present in the message reflects detection of a keyword or an emotion in operation 504. In particular embodiments, if the indicator is for neither, then the ASM 140 can simply ignore the event notification message as it is presumed the indicator is not relevant with respect to the service aspects provided by the ASM 140 (this operation is not shown in FIG. 5B).

Assuming the indicator reflects the detection of a keyword, then the process 500B proceeds to a series of tests with respect to the keyword detected. Firstly, the ASM 140 determines if the indicator identifies an instance of detecting a keyword reflecting the remote party asking about current promotions in operation 520. If the answer is yes, then the ASM 140 provides the appropriate information regarding current promotions to the agent's terminal in operation 522.

Secondly, if the indicator does not identify an instance of detecting a keyword reflecting the remote party inquiring about current promotions, then the ASM 140 determines if the indicator identifies an instance of detecting a keyword reflecting the remote party inquiring about current product recalls in operation 524. If the answer is yes, then the ASM 140 provides the appropriate information regarding current recalls to the agent's terminal in operation 526.

Thirdly, if the indicator does not identify an instance of detecting a keyword reflecting the remote party inquiring about current product recalls, then the ASM 140 determines if the indicator identifies an instance of detecting a keyword reflecting the agent uttering a curse word in operation 528. If the answer is yes, then the ASM 140 immediately bridges in the supervisor to the call in operation 532. If the answer is no, then a keyword has been detected that the ASM 140 is not configured to act upon and the ASM 140 may provide an appropriate response, such as simply ignoring the message, in operation 530.

Thus, if the ASM 140 has received a semantic event notification message, the ASM 140 is configured to perform certain actions upon indications of the remote party asking about promotions or product recalls or the agent uttering a curse word. In this instance, the actions preformed by the ASM 140 do not depend on detecting any particular emotional level with respect to the agent or the remote party, and hence are not dependent on detecting any particular emotional characteristic.

Next, the process flow is described with respect to the ASM 140 processing non-semantic emotional indicators received in event notification messages. Thus, returning to operation 504, if the indicator instead reflects the detection of an emotion, then the ASM 140 determines whether the indicator is associated with the agent or the remote party in operation 506. Recall that in various embodiments a call leg 127 may have different voice streams for the agent and the remote party so that the SAM 120 can detect and report whether a particular speech characteristic was associated with the agent or the remote party.

In this embodiment, the emotional indicator in the event notification message indicates an observed emotion and an associated emotional level, such as, for example, anger and an indication of a relative anger level. In this case, there are at least three anger levels characterized as low, medium, and high. Thus, in operation 506, the ASM 140 determines whether the emotion indicator is associated with the agent or the remote party. If the emotional indicator is associated with the agent, then the ASM 140 provides the agent with a reminder in operation 508 to stay calm regardless of the emotional level.

If, however, the emotion indicator is associated with the remote party, then the action to be taken by the ASM 140 is dependent on the emotional level. For instance, if the ASM determines the emotional level is low in operation 510, then the ASM 140 sends a reminder to the agent in operation 508 to remain calm. However, if the ASM 140 determines the emotional level is medium in operation 512, then the ASM 140 sends the agent an offer to have a supervisor bridged into the call in Operation 514. Finally, if the ASM 140 determines the emotional level is high in operation 512 (e.g., a "no" is determined with respect to the emotion level being medium), then the ASM 140 bridges a supervisor into the call immediately without input from the agent in operation 532.

Thus, the process shown in FIG. 5B illustrates how non-semantic speech characteristics can be used to address a particular situation during a call. In this example, the non-semantic speech characteristics were processed independently from the semantic indicators and do not rely on any semantic interpretation. That is to say, the ASM 140 responds accordingly based on an emotional level indicated in the event notification messages, regardless of what words the agent or remote party spoke.

However, it should be understood that in some instances a non-semantic indicator may be used in conjunction with a semantic indicator such as a particular word spoken by the agent or the remote party. For example, an ASM 140 may respond differently to receiving an indicator of a remote party having a high emotional level in their speech than receiving an indicator of a remote party having a high emotional level in their speech and detection of the remote party uttering certain words that can be construed as threats.

Finally, it is noted that the process flow shown in FIG. 5B is designed to receive and process separate event notification messages comprising semantic and non-semantic indicators. While in other embodiments, a single event notification message may contain both types of indicators and the ASM 140 may be configured to receive and process accordingly. That is to say, the format and structure of a particular speech-related event notification message may be coordinated with the processing of such a message by a particular ASM 140, and thus a variety of formats and/or structures for a message can be defined to accommodate various ASMs 140.

Exemplary Computer Processing Device

Figure 6:
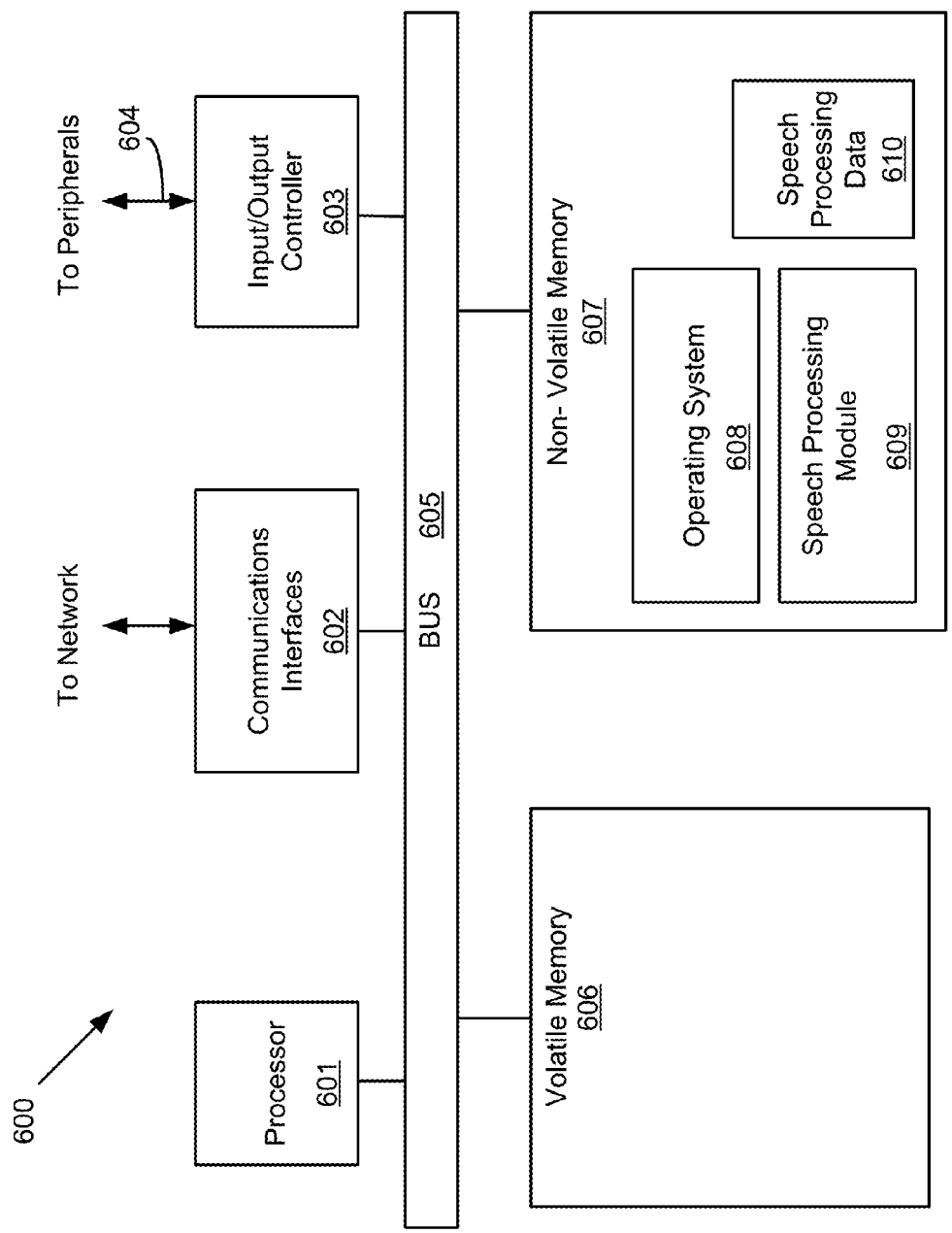
FIG. 6 illustrates one embodiment of a processing system for implementing the various concepts and technologies disclosed herein.

FIG. 6 is an exemplary schematic diagram of a computer processing system 600 that may be used in embodiments to practice the technologies disclosed herein, including the SAS 155, the SAM 120, the EVHM 130, and/or an ASM 140. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. The system 600 may represent the processing system for one or more components executing any of the above-mentioned modules.

As shown in FIG. 6, the processing system 600 may include one or more processors 601 that may communicate with other elements within the processing system 600 via a bus 605. The processor 601 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In particular embodiments, the processing system 600 may include one or more communications interfaces 602 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 603 may also communicate with one or more input devices or peripherals using an interface 604 such as, but not limited to: a keyboard, a mouse, a touch screen/display input, microphone, pointing device, etc. The input/output controller 603 may also communicate with output devices or peripherals, such as displays, printers, speakers, headsets, banner displays, etc. These may be used, in part, to receive administrator input, such as for configuring the system's operation.

The processor 601 may be configured to execute instructions stored in volatile memory 606, non-volatile memory 607, or other forms of computer-readable storage media accessible to the processor 601. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store various program code modules and data, which also may be loaded into the volatile memory 606 at execution time (though not shown as loaded in the volatile memory in FIG. 6). For example, the non-volatile memory 607 may store one or more modules such as a speech processing module 609 that implements and performs one or more of the above-mentioned process flows associated with the technologies disclosed herein, as well as an operating system module 608. These modules may also manage and use data such as speech processing data 610, for example, used to structure event notification messages in particular embodiments. The data and/or modules in the non-volatile memory 607 may be copied in the volatile memory 606 at run time. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the processor 601 and may form a part of, or may interact with, the modules.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/ or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation. Furthermore, the examples for illustrating the concepts and the technologies herein have focused on agents in a contact center, but could be easily applied to other types of applications.

The invention claimed is:

1. A method for providing speech-related characteristics of speech audio during a call involving a remote party and an agent of a call center, comprising:
   bridging in a speech analytics system ("SAS") to the call, wherein the SAS receives the speech audio from at least one of the agent and the remote party;
   analyzing the speech audio by the SAS to ascertain a semantic speech characteristic of the speech audio using a semantic speech analytics engine, the semantic speech characteristic indicating a meaning of speech or uttered word made by at least one of the remote party and the agent;
   analyzing the speech audio by the SAS to ascertain a non-semantic speech characteristic of the speech audio using a non-semantic speech analytics engine, the non-semantic speech characteristic being pertinent to at least one of the remote party and the agent or delivery of the speech by at least one of the remote party and the agent that does not directly indicate the meaning of the speech or the uttered word made by at least one of the remote party and the agent;
   determining by the SAS to send the semantic speech characteristic to a first application specific module ("ASM") and not to a second ASM, the first ASM configured to perform functionality for a first particular application and the second ASM configured to perform functionality for a second particular application in which the first particular application is different than the second particular application;
   determining by the SAS to send the non-semantic speech characteristic to the second ASM and not to the first ASM;
   providing the semantic speech characteristic using a first speech-related event notification message to the first ASM and the non-semantic speech characteristic using a second speech-related event notification message to the second ASM;
   performing the functionality for the first particular application by the first ASM in response to receiving the first speech-related event notification message; and
   performing the functionality for the second particular application by the second ASM in response to receiving the second speech-related event notification message.

2. The method of claim 1 further comprising:
   generating a call instance data structure in the first ASM in response to receiving a call-related event notification message prior to receiving the first speech-related event notification message, wherein the call instance data structure stores an identifier of the call and the first speech-related event notification message comprises the identifier of the call.

3. The method of claim 1, wherein performing the first particular application by the first ASM comprises:
   causing a window to be displayed on a computer used by the agent; and performing the second particular application by the second ASM comprises:
   causing a supervisor to bridge onto the call.

4. The method of claim 1 further comprising:
   providing the speech audio in parallel to the semantic speech analytics engine and the non-semantic speech analytics engine.

5. A speech analytics system for use in a contact center comprising:
   one or more computer processors; and
   memory storing a speech analytics module (SAM), a first application specific module (ASM) configured to perform functionality for a first particular application, and a second configured to perform functionality for a second particular application that is different from the first particular application, wherein
   the one or more computer processors execute the SAM to:
      receive speech audio of a call involving an agent and a remote party,
      analyze the speech audio to detect a semantic speech characteristic and a non-semantic speech characteristic in the speech audio, the semantic speech characteristic indicating a meaning of speech or uttered word made by at least one of the agent and the remote party and the non-semantic speech characteristic being pertinent to at least one of the agent and the remote party or delivery of the speech by at least one of the agent and the remote party that does not directly indicate the meaning of the speech or the uttered word made by at least one of the agent and the remote party,
      determine to send the semantic speech characteristic to the first ASM and not to the second ASM,
      determine to send the non-semantic speech characteristic to the second ASM and not to the first ASM,
      send a first speech-related event notification message that identifies the semantic speech characteristic to the first ASM, and
      send a second speech-related event notification message that identifies the non-semantic speech characteristic to the second ASM;
   the one or more computer processors execute the first ASM to:

receive the first speech-related event notification message, and perform the functionality for the first particular application in response to receiving the first speech-related event notification message; and the one or more computer processors execute the second ASM to:

receive the second speech-related event notification message, and perform the functionality for the second particular application in response to receiving the second speech-related event notification message.

6. The system of claim 5, wherein the first particular application comprises causing data to display on a pop-up window on a computer used by the agent and second particular application comprises causing a supervisor to bridge onto the call.

7. The system of claim 5, wherein the one or more computer processors execute the first ASM to:

generate a call instance data structure in response to receiving a call-related event notification message prior to receiving the first speech-related event notification message, the call instance data structure configured to store an identifier of the call and the first speech-related event notification message comprises the identifier of the call.

8. The system of claim 5, wherein the one or more computer processors execute the SAM to generate the first speech-related event notification message and the second speech-related event notification message with a call reference identifying the call.

9. A non-transitory, computer-readable medium comprising computer-executable instructions that when executed cause at least one computer processor to:

receive a call-related event notification message indicating an existence of a call, the call-related event notification message comprising a call reference associated with the call;

generate a call instance data structure associated with the call reference in response to receiving the call-related event notification message;

receive at least one speech-related event notification message originating from a speech analytics module, the at least one speech-related event notification message comprising a first indicator of a semantic speech characteristic detected in speech audio of the call indicating a meaning of speech or uttered word made by at least one party on the call, a second indicator of a non-semantic speech characteristic detected in the speech audio of the call being pertinent to at least one party on the call or delivery of the speech by at least one party on the call that does not directly indicate the meaning of the speech or the uttered word made by at least one party on the call, and the call reference;

in response to receiving the at least one speech-related event notification message, perform a first particular application; and store data indicating receiving of the at least one speech-related event notification message in the call instance data structure.

10. The non-transitory, computer-readable medium of claim 9, wherein the instructions when executed further cause the at least one computer processor to:

receive a second call-related event notification message indicating a termination of the call, the second call-related event notification message comprising the call reference; and store at least a portion of the data in the call instance data structure in a non-volatile memory.

11. A non-transitory, computer-readable medium comprising computer-executable instructions that when executed cause at least one computer processor to:

receive an indication of an establishment of a call between an agent and a remote party;

receive speech audio associated with the call;

ascertain a plurality of speech analytics engines to analyze the speech audio, wherein the plurality of speech analytics engines comprises a first speech analytics engine to process the speech audio to ascertain semantic aspects of the speech audio indicating a meaning of speech or uttered word made by at least one of the agent and the remote party and a second speech analytics engine to process the speech audio to ascertain non-semantic aspects of the speech audio being pertinent to at least one of the agent and the remote party or delivery of the speech by at least one of the agent and the remote party that does not directly indicate the meaning of the speech or the uttered word made by at least one of the agent and the remote party; and provide the speech audio to the plurality of speech analytics engines for the duration of the call;

determine to transmit an event notification message to a first application specific module based on the second speech analytics engine ascertaining a non-semantic aspect of the speech audio, the first application specific module configured to perform functionality for a first particular application;

determine not to transmit the event notification message to a second application specific module, the second application specific module configured to perform functionality for a second particular application that is different from the first particular application; and transmit the event notification message to the first application specific module.

12. The non-transitory, computer-readable medium of claim 11, wherein the instructions when executed further cause the at least one computer processor to:

provide the speech audio in a parallel manner to the plurality of speech analytics engines.

13. The non-transitory, computer-readable medium storing instructions of claim 11, wherein the instructions when executed further cause the at least one computer processor to:

provide the speech audio to the first speech analytics engine and then to the second speech analytics engine after providing the speech audio to the first speech analytics engine.

14. The non-transitory, computer readable medium of claim 11, wherein the instructions when executed further cause the at least one computer processor to:

receive an occurrence message generated by the second speech analytics engine, the occurrence message identifying the non-semantic aspect of the speech audio and having a first protocol structure; and generate the event notification message having a second protocol structure based on the occurrence message generated by the second speech analytics engine.

* * * * *